Sept. 10, 1929.   J. W. VAN METER   1,727,457
METHOD FOR UNDERGROUND ANIMAL EXTERMINATION
Original Filed June 9, 1921   2 Sheets-Sheet 1
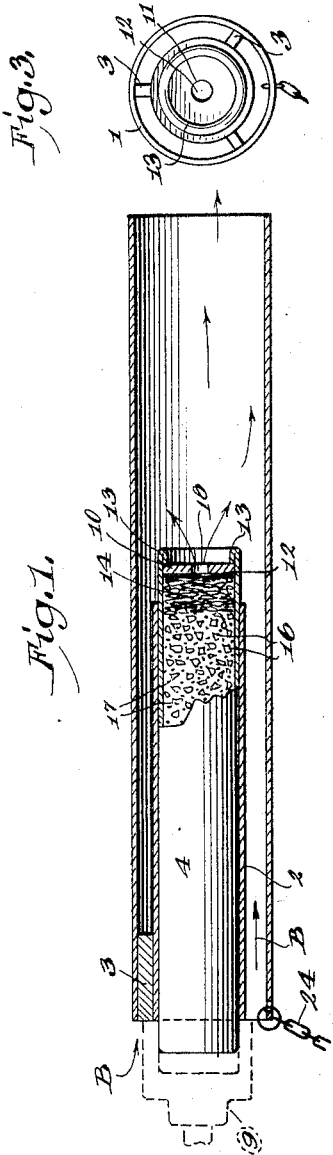
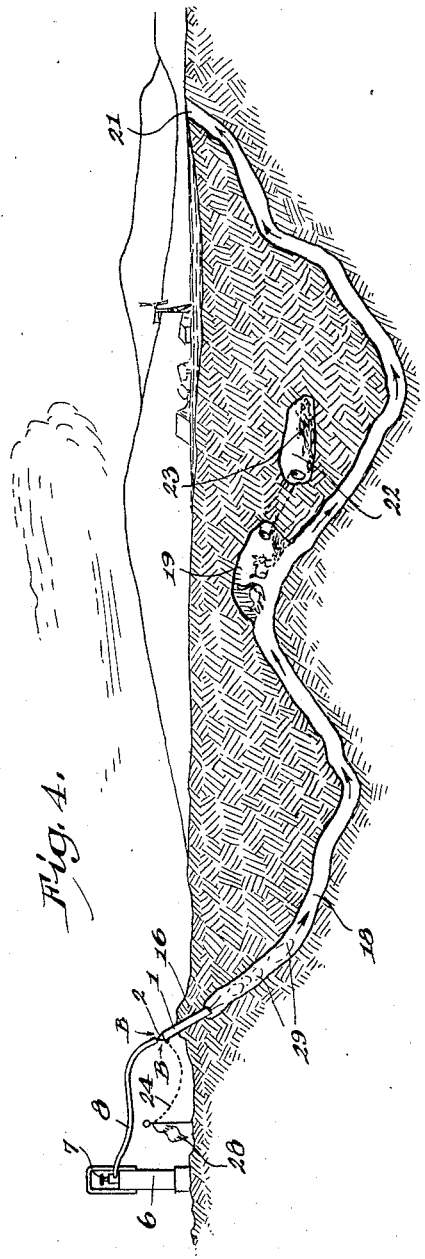
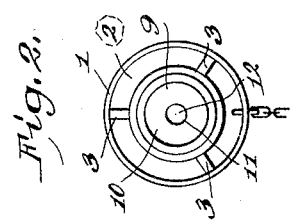

Sept. 10, 1929.  J. W. VAN METER  1,727,457
METHOD FOR UNDERGROUND ANIMAL EXTERMINATION
Original Filed June 9, 1921   2 Sheets-Sheet 2
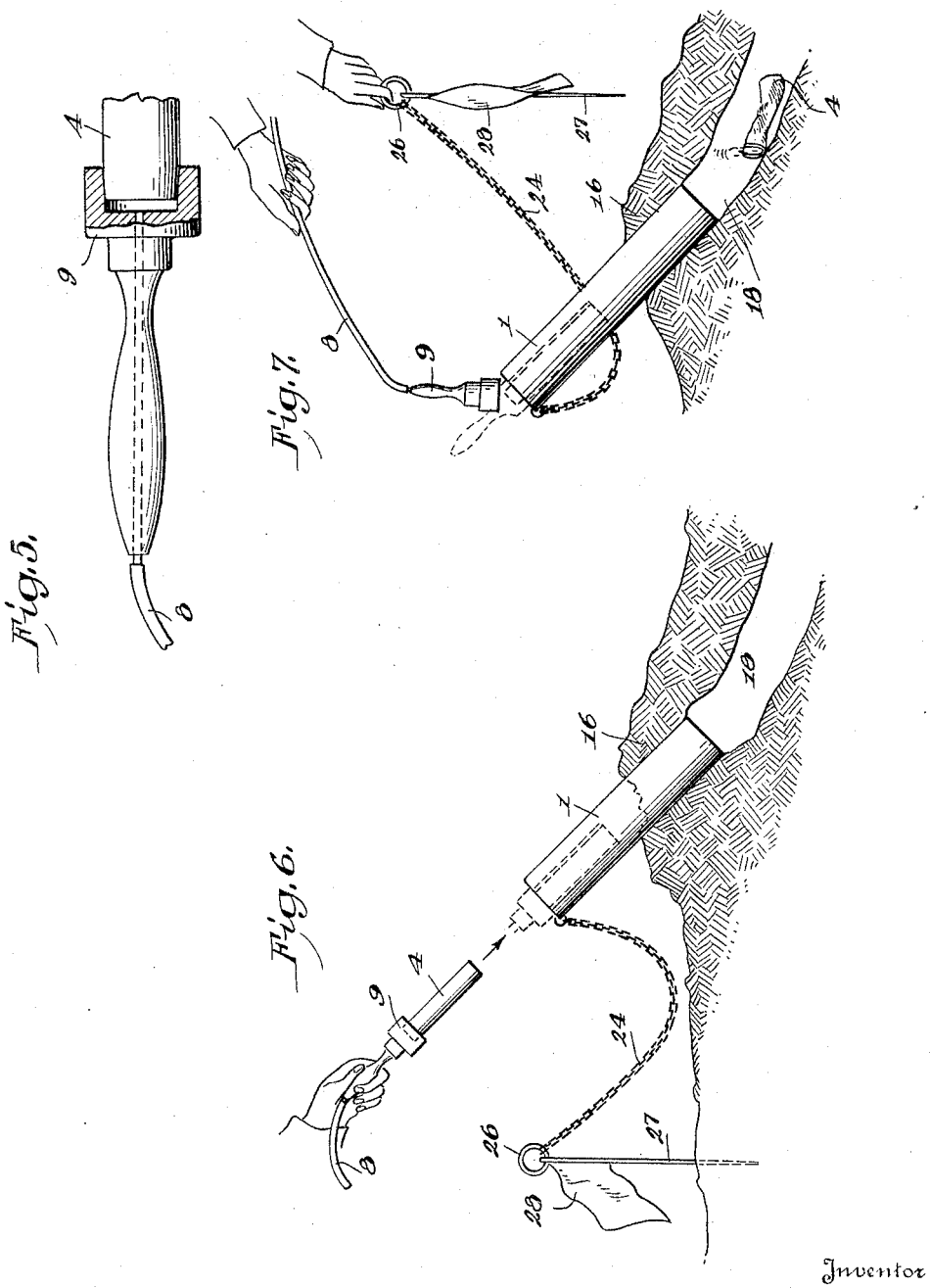

Patented Sept. 10, 1929.

1,727,457

UNITED STATES PATENT OFFICE.

JAMES W. VAN METER, OF SAN RAFAEL, CALIFORNIA.

METHOD FOR UNDERGROUND ANIMAL EXTERMINATION.

Original application filed June 9, 1921, Serial No. 476,111. Divided and this application filed December 12, 1921. Serial No. 521,836.

The present invention is an improved method for underground animal extermination.

The primary object of the invention is to provide a method for generating poison gas and causing it to traverse a burrow or underground passage to the innermost passages or recesses thereof. I accomplish this by creating a gas within a previously prepared cartridge and by introducing said gas to one entrance to the passage from a cartridge within a tube which is spaced from a surrounding tube in a manner adapted to form an air space open at both ends between the tubes.

With the apparatus hereinafter described the entire operation by both operators can be carried on without either operator handling or coming in direct contact with the deadly agents used.

A distinct advantage of my method lies in the fact that the gas used is formed by the action of one chemical upon another and, by the ingenious arrangement of parts, the cartridge is so placed that the chemical combination necessary to liberate gas takes place after the cartridge has been placed in the entrance of the burrow and, after the gas has been liberated, the discharged cartridge is released from a safe distance and all poisonous residue drops in the burrow underground this affording protection to life above ground.

The present invention is a division of my copending application for Letters Patent of the United States, Serial No. 476,111, filed June 9, 1921, patented January 10, 1922, Patent No. 1,403,461.

In the accompanying two sheets of drawings:

Figure 1 is a central section of two tubes spaced apart in fixed co-axial relation.

Figure 2 is an end elevation of Figure 1.

Figure 3 is an opposite end elevation of Figure 1.

Figure 4 is a section of a fragment of earth showing a rodent's burrow and communicating chambers, illustrating my method of extermination.

Figure 5 is a side elevation partly in section of a socket handle for removably engaging one end of a cartridge.

Figure 6 is a fragmentary view of earth in section showing the entrance of a burrow and illustrating the method of preparing the same for my extermination operation.

Figure 7 is a view similar to Figure 6 showing my method of disengaging the cartridge, and thereafter retrieving the apparatus for repeated operation.

Referring to the drawings, Figure 1, the numeral 1 indicates a tube, and 2 a parallel inner tube spaced from tube 1 by radially disposed spacers 3.

A combustible chemical cartridge 4 fits loosely in the tube 2 and will drop therethrough when the tube is in a vertical position.

In carrying out my method of animal extermination, I insert the tube 1 in a hole in the ground as indicated in Figure 4, tamping the ground as indicated at 6.

My apparatus is particularly adapted to operation on a large scale. In field work one operator locates the holes and places a tube 1 in the entrance of the burrow tamping the ground around same. An operator handling the chemical apparatus to be later described follows up and discharges cartridges in the prepared holes and thus effectively exterminates pests without one operator losing time awaiting the preparation by the other.

The contents of the cartridge 4 are combustible and adapted to liberate fumes or gases, which for the purposes of this specification are termed secondary gases, when acted upon by a primary gas such as chlorine. Attention is called to my co-pending applications for patents filed June 15, 1920, Serial No. 389,509, patented December 13, 1921, Patent No. 1,399,829; filed August 31, 1920, Serial No. 407,073, patented June 13, 1922, Patent No. 1,419,653; and filed April 11, 1921, Serial No. 460,523, patented December 21, 1921, Patent No. 1,401,293.

For the purpose of illustration, assume that chlorine under pressure is in a cylinder 6. If valve 7 thereon be opened the chlorine finds its way through a hose 8 terminating in a socket 9 engaging the cartridge 4. As both ends of the cartridge 4 are alike I show one end in central section in Figure 1.

The cartridge is closed at both ends by wads 10 having apertures 11 therein normally closed by partitions 12 of thin material, such as paper, which is adapted to be easily ruptured before the cartridge is inserted in the tube 2 and is so ruptured.

The shell of the cartridge is preferably of paper and is crimped inwardly as shown at 13 to engage the wads 10. A small quantity 14 of excelsior or other suitable filler is placed against the wads 10 to form an easily compressible packing which is combustible and forms a non-poisonous cushion which prevents contamination of a puncturing tool used to open the cartridge when same is inserted in tube 2.

The central portion of the cartridge 4 is filled with sawdust particles 16 which in themselves contain moisture and intermingled therewith are metallic particles 17 adapted, when contaminated with chlorine in the presence of the moisture, to set up an intense chemical combustion. I prefer to impregnate the sawdust with creosote to insure proper distribution through the sawdust of the metallic particles and cause adherence of same.

In Figure 4 I show a subterranean passage 18 representing a ground squirrel's burrow leading to a nest 19, and provided with a rear outlet 21. I also show a storage compartment 22 in which the animals have deposited a supply of food as shown at 23.

In carrying out my method of animal extermination an operator inserts a tube 1 in the entrance of a burrow 18 as shown in Figures 4 and 6 tamping the ground as indicated at 16. The tube 1 has attached thereto a chain 24 the opposite end of which is secured to an eye in a staff 27 adapted to penetrate the ground and support a flag 28.

When the holes have been thus prepared an operator carrying a chlorine tank 6, directed by the flag 28, advances and places a cartridge 4 in socket 9, as shown in Figure 6, and inserts the cartridge in tube 2 where it is suspended by the socket 9 which rests against the upper end of the tube.

The valve 7 is now opened and chlorine under pressure traverses tube 8 and enters the cartridge 4, the ends of which have been ruptured at 11, and this sets up a combustion throwing down a secondary gas, as indicated at 29. Air enters the spaces B between the tubes and the heavy gas emanating will roll down the burrow and entirely fill the chambers 19 and 22 and will kill all the animals and at the same time poison thoroughly all food stored in the passages. Such gas expands as it is generated and is directed by the cartridge from which it issues and hence traverses the burrow from end to end. Owing to the arrangement of the cartridge in the outer tube so that an air passage is formed through the latter, air is supplied to the burrow simultaneously with the generation of the secondary gas, by the suction caused by the latter, thus avoiding the formation of a partial vacuum behind the secondary gas and a consequent retardation of such gas. Moreover, the air thus sucked into the burrow by the secondary gas dilutes the gas and increases its volume without seriously diminishing its poisonous efficiency. This also enables an economy in the use of the chlorine to be effected.

After a suitable predetermined amount of chlorine has been released from the container 6 and the cartridge content consumed, which occurs in a very short space of time, the valve 7 is closed.

It is now of the utmost importance to dispose of all poisonous residue and retrieve the tube 1 for another operation. The operator first pulls on the tube 8 as shown in Figure 7, the pull being exerted from a direction angular to the tube and adapted to disengage the socket 9 from the upper end of the cartridge 4 which is held within the tube 2. As soon as the socket separates from the cartridge, the cartridge drops of its own weight down the hole. The operator now pulls chain 24 from an angular direction which draws the tube from the ground and then tamps the entrance of the burrow 18.

It will be seen that the cartridge has been discharged and buried and the apparatus recovered without the operator having come in contact with dangerous parts or at any time being in close proximity to the poisonous elements or emanations.

In Figure 5 I show the socket 9, and at 31 I indicate a taper bore to form a force fit with the end of cartridge 4. It will be seen that my cartridge, Figure 1, is braced crosswise of the wads 10 to resist any tendency to collapse when thus engaged by socket 9, while the machine made crimp 13 secures the protector 12 and insures against any tampering with, unloading or reloading of the cartridge by unscrupulous persons.

Having thus described my invention, I claim:—

The method of destroying animal life in a burrow, consisting in placing reactive material in the burrow which when acted upon by chlorine generates a secondary poisonous gas and smoke, and supplying such chlorine to such material to cause such secondary gas and smoke to be generated and to expand throughout the burrow and issue from the connected entrances thereof.

In witness whereof I affix my signature.

JAMES W. VAN METER.